United States Patent [19]

Annamalai

[11] Patent Number: 5,063,575

[45] Date of Patent: Nov. 5, 1991

[54] APPARATUS AND METHOD FOR PROPER BYTE ALIGNMENT IN AN ENCODER/DECODER

[75] Inventor: Kadiresan Annamalai, Milpitas, Calif.

[73] Assignee: Advanced Micro Devices, Inc., Sunnyvale, Calif.

[21] Appl. No.: 339,722

[22] Filed: Apr. 17, 1989

[51] Int. Cl.$^5$ .............................................. H04L 5/24
[52] U.S. Cl. ..................................... 375/108; 370/48; 370/94.2; 375/118
[58] Field of Search ...................... 375/107, 118, 117; 370/94.1, 94.3, 94.2, 85.4, 108, 48, 49; 340/825.15; 369/47, 48, 60; 379/82, 89

[56] References Cited

U.S. PATENT DOCUMENTS

| | | | |
|---|---|---|---|
| 4,225,919 | 9/1980 | Kgu et al. | 370/85.8 |
| 4,569,062 | 4/1986 | Dellande et al. | 375/117 |
| 4,680,581 | 7/1987 | Kozlik et al. | 370/85.4 |
| 4,849,969 | 7/1989 | Annamalai | 370/94.1 |
| 4,849,970 | 7/1989 | McCool | 370/94.1 |
| 4,868,784 | 9/1989 | Marshall et al. | 364/900 |
| 4,878,219 | 10/1989 | Kaufman et al. | 370/97 |
| 4,890,304 | 12/1989 | Annamalai | 375/114 |
| 4,932,024 | 6/1990 | Bonicioli et al. | 370/85.12 |
| 4,951,280 | 8/1990 | McCool et al. | 370/85.14 |

Primary Examiner—Benedict V. Safourek
Assistant Examiner—Young Tse
Attorney, Agent, or Firm—Lowe, Price, LeBlanc and Becker

[57] ABSTRACT

A system is disclosed that provides for the proper decoding of data information in an Encoder-Decoder ENDEC receiver in a Fiber Distributed Data Interface FDDI network. The system decouples the receiver from the data information when idle signals are provided thereto. In so doing "fragment bytes" associated with such transmission are not decoded.

12 Claims, 12 Drawing Sheets

BYTESYNC TIMING - 9 BITS
FROM PREVIOUS ALIGNMENT

BYTESYNC TIMING - 6 BITS
FROM PREVIOUS ALIGNMENT

BYTESYNC TIMING - 4 BITS
FROM PREVIOUS ALIGNMENT

FIG. 4G

BYTESYNC TIMING - 3 BITS FROM PREVIOUS BYTE ALIGNMENT

FIG. 4I

BYTESYNC TIMING - 1 BIT FROM PREVIOUS ALIGNMENT

FIG. 4J

BYTESYNC TIMING - O BIT
FROM PREVIOUS ALIGNMENT

APPARATUS AND METHOD FOR PROPER BYTE ALIGNMENT IN AN ENCODER/DECODER

FIELD OF INVENTION

This invention relates to the transmission of digital data over a network, and more particularly, to the alignment of bytes of serial data transmitted over a local area network.

BACKGROUND OF THE INVENTION

In local area networks, when a node joins the network, the first stream of signals which it receives are connection management symbols. The connection management symbols are especially chosen so that they can be decoded by an encoder/decoder (ENDEC) of the node without regard to their alignment within a byte of the signal stream. In a standard 5-bit/4-bit (5B/4B) coding arrangement, the start of the so-called connection management symbols can be at any one of the 10 bits within the "byte." Decoding of these connection management symbols proceeds without regard to this alignment because of their chosen nature. However, once these symbols are processed, decoding of the data packet following these symbols requires that their bytes be aligned.

For token ring Fiber Distributed Data Interface networks, the physical layer has to reliably decode the incoming data stream, without any deletion or modification of frame bits. Also, the receiver is allowed to delete only few bits of an IDLE Symbol for compensation of clock differences, so as to ensure a minimum number of preambles before a packet.

The physical layer of the FDDI is implemented by a combination of Encoder/Decoder (ENDEC) and fiber optic transceiver. The encoder performs repeat filter, 5B/4B encoding, parallel to serial conversion, and Non-Return to Zero (NRZ) to Non-Return to Zero Invert (NRZI) Code conversion. The decoder performs NRZI to NRZ conversion, clock recovery, serial to parallel conversion, byte alignment, 5B/4B code conversion, elasticity buffer function and line state decode.

The ENDEC is implemented in silicon by means of a two chip set called an ENDEC chip and an ENDEC Data Separator. The ENDEC chip performs the encoder, control and status functions, all the decoder functions and line state detect function. The ENDEC Data Separator performs the recovery of the clock signal and retimes the data from the received data.

In a FDDI system, there will be a plurality of ENDECs located as a token ring. In such a system each of the ENDECs have their own clock frequencies. For example the FDDI standard requires that the clock frequency of an ENDEC be in the range of 125 Mhz +/− 6.25 KHz. This 12.5 KHz range may significantly affect the information being transmitted or received unless the information received by the receive ENDEC is synchronized with the frequency of the transmitted information. Typically, this synchronization is accomplished by deleting or adding IDLE bits of information by the receive ENDEC.

One of the problems associated with byte synchronization has been addressed in copending U.S. patent application Ser. No. 07/268,396 entitled "Reliable Recovery of Data in an Encoder/Decoder" filed on Nov. 7, 1988 and assigned to the assignee of the present invention. In this disclosure a method and apparatus is provided that allows for the recovery of data in an ENDEC receiver without deleting any of bytes of information. Through the system disclosed in the above-identified patent application no data information is lost during transmissions between nodes in an FDDI network.

However, it is important that the information be aligned within the receiving node to provide for reliable decoding. Typically, the required alignment was provided by the detection of a packet delimiter within the ENDEC called a "JK" symbol-pair. Under this procedure, a preamble "byte" immediately preceding the "JK" symbol-pair could be decoded improperly. Also because of the manner in which an elastic buffer, used in a typical ENDEC receiver, is recentered upon detection of the "JK" delimiter and then initialized, a few bits in the byte-stream are dropped, resulting in a non-integral number of bytes in the preamble. Hence, a new incoming packet of information might have a boundary area that is different from the previous packet. Therefore, to ensure the proper decoding of the new packet of information, the decoder logic requires byte synchronization information to load in the data so that it is aligned to the latest JK byte. As a result of the nonintegral number of preamble or IDLE bytes before the JK byte, the byte before the JK byte will contain a few bits from the IDLE symbols and one or more bits from the JK byte.

This type of byte in the context of this application will be referred to as a fragment byte. This "fragment" byte will be interpreted as a spurious signal by the error monitoring mechanism of the node.

It is important, therefore, to provide a method and apparatus for ensuring that data information is reliably transmitted between nodes in a FDDI network. It is also important that the data is transmitted in accordance with FDDI codes to ensure that communication between each node in the FDDI network is proper. More specifically, it is important that the fragment bytes present in certain FDDI codes be decoded in such a way that data information associated with that byte is not misinterpreted.

SUMMARY OF THE INVENTION

A method and apparatus for aligning digital signals provided to an ENDEC receiver is disclosed. More particularly, this receiver includes a method and apparatus for reliably decoding the data information received from other stations in a FDDI network. In an encoder/decoder (ENDEC) receiver utilized in a Fiber Distributed Data Interface (FDDI) network that includes a first in-first out (FIFO) memory and serial to parallel shift register, a system is provided for ensuring that the data information received from other nodes is reliably decoded.

The system includes means for detecting a first predetermined signal received by the shift register from another node in said network, the predetermined signal indicating the other node is idle. The system further includes means for preventing the writing of data information to the FIFO memory when the predetermined signal is detected and means for allowing the data information to be written to the FIFO memory from said shift register upon the detection of a second predetermined signal being received by the shift register. By providing a system such as above-mentioned, the "fragments bytes" associated with the digital signal transmission in an FDDI network are never written into the ENDEC receiver and therefore are not decoded improperly by the receiver.

DETAILED DESCRIPTION

The present invention comprises a novel method and apparatus for aligning digital information within an encoder/decoder (ENDEC) of a FDDI network. The following description is presented to enable a person skilled in the art to make use of the invention and is provided in the context of a particular application and its requirements. Various modifications to the embodiment will be readily apparent to those skilled in the art and the generic principles defined herein may be applied to other embodiments and applications without departing from the spirit and scope of the present invention. Thus, the present invention is not intended to be limited to the embodiment shown but is to be accorded the widest scope consistent with the principles and features disclosed herein.

To more fully explain the present invention, its use in a specific environment will be described. It should be understood, however, the present invention is not limited to this specific environment. In 5B/4B codes for a Fiber Distributed Data Interface (FDDI) network, the start of a packet of information is a unique identifier. In an FDDI network, a certain code identifies a certain activity. Therefore, in this embodiment the start of a packet or start byte has the code (1100010001) and is commonly referred to as the JK byte. There are a plurality of connection management symbols or line state conditions. These symbols are used to provide information between the different nodes on the network to establish connections between those nodes. Typical connection management symbols designators and their codes are Quiet (00000), Halt (00100), Master (00100 00000) and Idle (11111).

In a typical packet of information the JK byte will be at the beginning of the packet. Prior to the start of JK byte a plurality of Idle symbols (11111) may be presented to the node. Idle symbols are used in between packets for maintaining clock synchronization. Idle symbols also serve as a mechanism for bit addition or deletion to accommodate clock differences between an originating station and receiving station.

As a result of bit addition or deletion, there may be a non-integral number bytes of preamble (or Idle symbols) in between packets. Accordingly, in previously known FDDI networks, a byte could contain a few bits from the Idle symbols and a few bits from the start or JK byte due to bit addition or deletion at the ENDEC receiver. These bytes are called "fragment bytes". These fragment bytes could be interpreted as line state conditions. If a fragment byte is interpreted as a line state condition then an error has occurred. These types of errors affect the reliability and integrity of the network.

The present invention provides a reliable method and apparatus within an ENDEC receiver for decoding packets of data information when fragment bytes are present. To more fully explain the features of the present invention, refer now to FIG. 1 which is a diagram of an ENDEC receiver 100 and ENDEC data separator 50.

Figure 1:
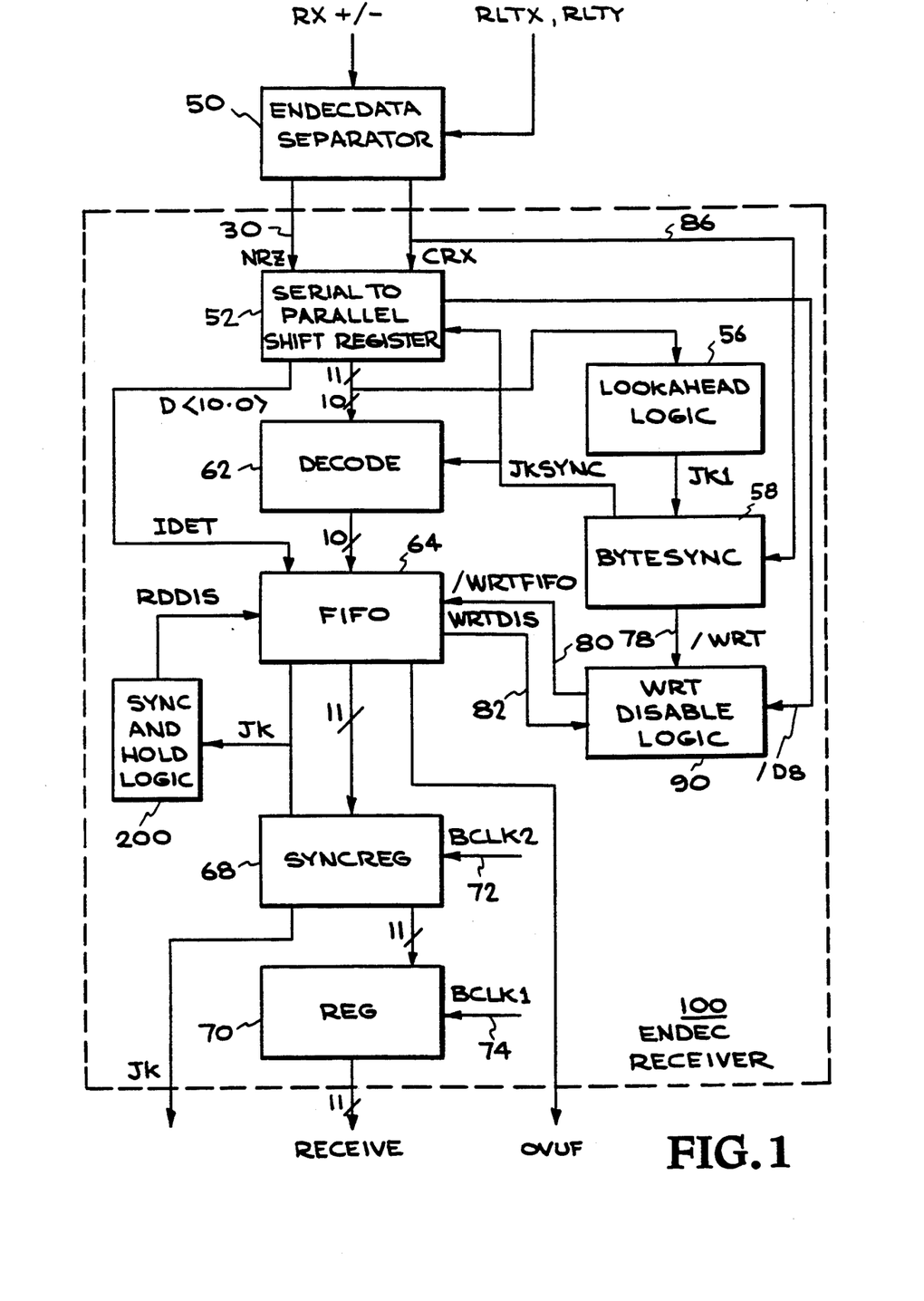
FIG. 1 is a block diagram of an ENDEC receiver in accordance with the present invention.

A control element, not shown in FIG. 1, provides control signals to the various elements shown in FIG. 1. Design and implementation of such control elements are well-known to those skilled in the art and, accordingly, will not be described herein. Serial data (Rx) is received on signal line 30 by a clock recovery block called the ENDEC Data Separator 50 which performs clock recovery and non-return-to-zero invert-on-ones (NRZI) to non-return-to-zero (NRZ) conversion. Block 50 generates a receiver clock signal (CRx) and the converted NRZ version of the serial data received on line 30.

Figure 2:
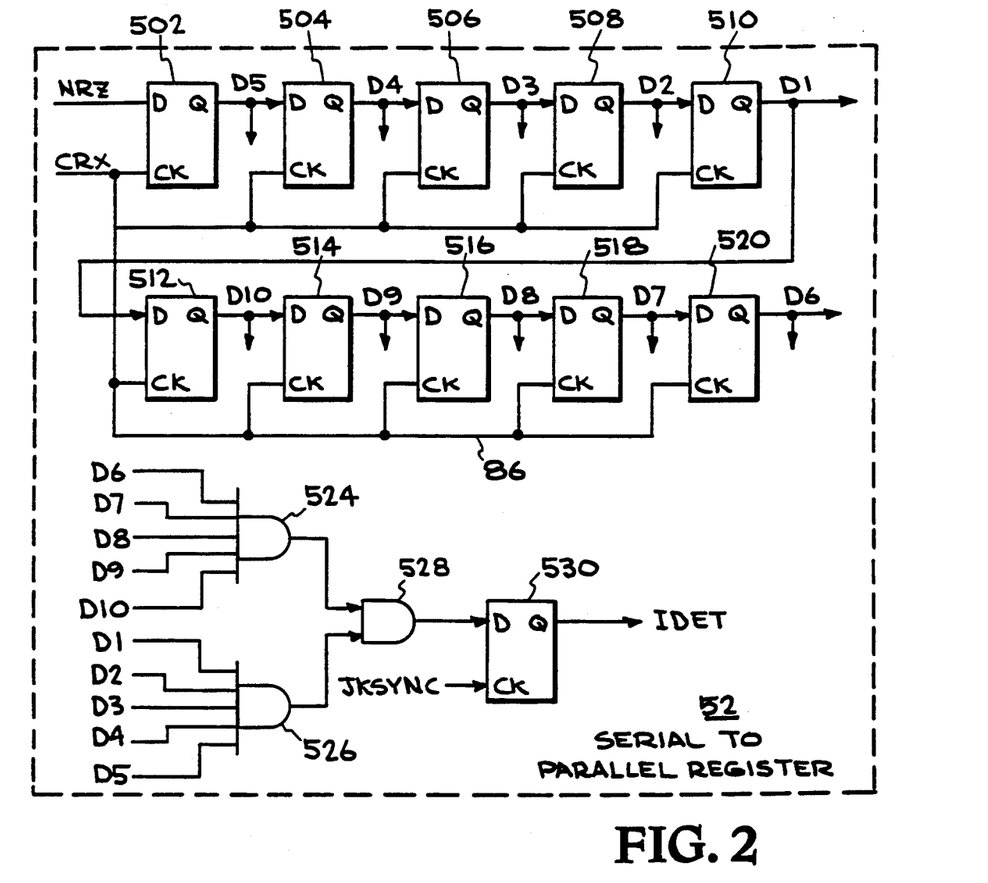
FIG. 2 is a block diagram of the serial-to-parallel shift register used in the ENDEC receiver of FIG. 1.

The CRx and NRZ signals are conducted to a serial-to-parallel shift register 52 of the receive portion of ENDEC as shown in FIG. 2. In this Figure, the serial to parallel register comprises a plurality of D-flip flops 502-520. NRZ signal is provided to the input of flip flop 502. The flip flops are clocked by the CRX signal. The output signal from one flip flop is the input signal for the next succeeding flip flop. Each of these flip flops provide output signals D5, D4, D3, D2, D1, D10, D9, D8, D7 and D6, respectively. D6-D10 are provided to the inputs of AND gate 524, and D1-D5 are provided to the inputs of AND gate 526. The outputs of gates 524 and 526 are provided to the inputs of AND gate 528. The output of AND gate 528 is provided to the input of D-flip flop 530. The JK SYNC signal from BYTE SYNC logic 58 serves as the clock signal of flip flop 530. The Q output of flip flop 530 is the idle detect signal IDET. Shift register 52 produces therefrom ten-bit parallel "bytes", D6, D7, D8, D9, D10, D1, D2, D3, D4, D5, corresponding to ten bits received in series on line 30.

Referring back to FIG. 1, the ten-bit "bytes" of data are transferred in parallel to DECODE 62. The serial to Parallel Shift Register 52 also detects the presence of the IDLE Bytes at the output synchronized to the JK SYNC information from BYTE SYNC logic and indicates the IDLE Byte (all 1s) by IDET signal to FIFO 64. Serial to Parallel Shift Register 52 also generates complemented output of the third bit from the right of the 10-bit shifter. This signal D8 86, shown in FIG. 2, is used to prevent the generation of a fragment byte, as will be explained later.

The ten-bit data bytes generated by shift register 52, together with the complemented version of the NRZ signal (NRZL) currently applied to the shift register 52, are conducted to a Lookahead Logic Block 56. Lookahead Logic Block 56 generates therefrom one logic signal; a JK1 signal which is set HIGH when a pattern of coded bits representing the JK symbol, shifted by one bit position is present in the shift register 52.

A byte synchronization (BYTE SYNC) block 58 receives the JK1 signal generated by Lookahead Logic Block 56. BYTE SYNC block 58 generates a byte alignment signal JK SYNC once for every ten bits of serial data received on line 30. BYTE SYNC block 58 synchronizes its generation of the JK SYNC signal with the reception of the one-bit lookahead signal JK1. A ten-bit "byte" at the input of DECODE 62 is synchronized by the JK SYNC signal.

BYTE SYNC logic also generates the /WRT signal 3-bit times after JK SYNC signal. The /WRT signal is conducted to WRT DISABLE LOGIC 90 via line 78. Received symbols are decoded in parallel by DECODE 62 and transferred in parallel to FIFO 64, synchronized by the /WRTFIFO signal from WRT DISABLE LOGIC 90 on line 80. The /WRT signal is delayed from JK SYNC to permit signal stabilization and decoding to proceed.

The SYNC register 68 receives the information from FIFO 64 and reads in the data responsive to a byte clock signal BCLK2 on line 72. The register 70 clocks in the information from Sync register 68 by a second byte clock signal, BCLK1 on line 74 which is one bit delayed from the first clock signal 72. The parallel information from 70 is provided to a media access control layer (not shown) which interprets the received information.

JK signal from FIFO 64 is active when JK appears at the last level of FIFO and is conducted to Sync & Hold logic 200. Sync & Hold logic 200 disables reading of FIFO 64 for 5 to 6 bit times (depending on the phase relation of local bit clock to received bit clock) by making RDDIS, conducted to FIFO 64, active during that time.

WRT DISABLE logic 90 receives WRTDIS 82 signal on line 82 from FIFO 64. WRTDIS 82 is active when IDET signal from Shifter 52 gets written to first level of FIFO 64. Once the WRTDIS line 82 signal goes active, WRT DISABLE logic 90 disables writing to FIFO 64 by making /WRTFIFO 80 signal inactive. The 8th D8 bit of the serial to parallel Shift Register 52 called /D8 is also conducted to WRT DISABLE logic 90 via line 86. When D8 is 0 the WRT DISABLE logic 90 is enabled and allows for writing into FIFO 64 by making /WRTFIFO line 80 active whenever /WRT line 78 is active.

The present invention is directed toward ensuring the information received is decoded properly without generation of a fragment byte. As has been before mentioned, oftentimes a byte will be presented to a node in the network that has a few bits of Idle symbols and a few bits of the JK byte. These "fragment bytes" have the potential for being decoded improperly by the ENDEC receiver 100. To eliminate this as a possibility, the present invention provides a method and apparatus for recognizing these fragment bytes and decoupling the ENDEC receiver 100 through WRT DISABLE logic 90 until a proper byte is provided to the receiver 100.

In this embodiment, the ENDEC receiver decouples the FIFO 64 upon receipt of a predetermined number of Idle symbols to ensure the improper data is not written into the registers. Typically, an IDLE symbol is represented by the code 11111. It is recognized by one of ordinary skill in the art, however, that an Idle symbol could be represented by a variety of other codes and that use of other IDLE symbol codes would be within the spirit and scope of the present invention. After the IDLE Symbols, the start or JK byte will be present to indicate the start of a packet of information. Accordingly, in this embodiment when a "0" appears in the shift register 52 after a certain number of "1"s (indicating a plurality of IDLE Symbols), there is an indication that the JK byte is entering the ENDEC receiver.

Figure 3:
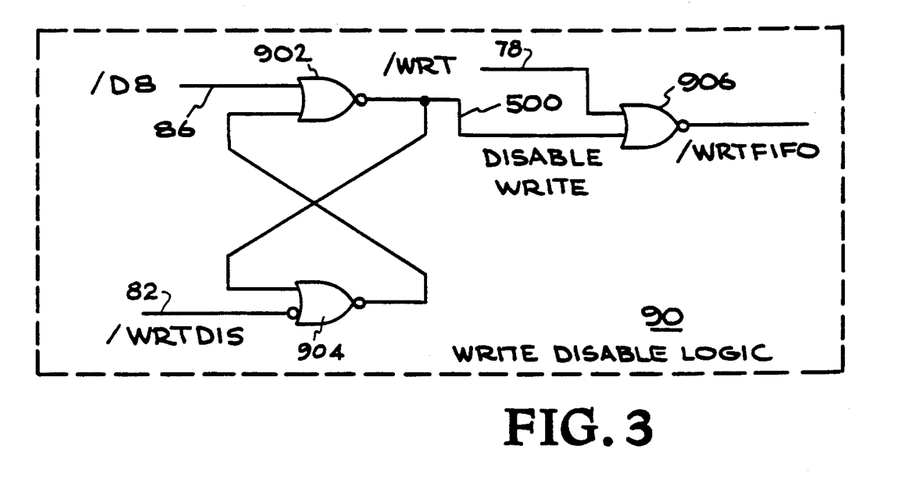
FIG. 3 is a block diagram of the write disable logic used in the ENDEC receiver of FIG. 1.

FIG. 3 is a logic diagram of a write disable circuit block 90 shown in FIG. 1. The write disable circuit 90 shown in this embodiment comprises an exclusive/or gates 902-906. One input of the NOR gate 902 receives signals via line 86 from the /D8 bit of serial to parallel register 52. The other input of gate 902 is coupled to the output of gate 904. The output of gate 902 is coupled to one input of NOR gate 904. The other input of gate 904 receives the write disable signal WRTDIS via line 82. The output from the gate 902 is coupled to one input of NOR gate 906 and the other input of gate 906 receives the /WRT signal via line 78.

The /WRTFIFO signal from write disable logic 90 to the FIFO 64 via line 80 is enabled only when a designated bit /D8 from shift register 52 goes HIGH via line 86. This bit in turn will cause the DISABLE WRITE 500 to go inactive. This designated bit /D8 indicates that the JK byte is fully present within the shift register 52.

Through the operation of the write disable logic 90 in combination with the Byte Sync logic 58 and the shift register 52, fragment bytes are never written into the FIFO 64 and therefore never have to be decoded. The system of the present invention therefore significantly reduces errors present within an FDDI network.

To more fully explain the operation of the present invention, refer now to FIGS. 4a to 4j. FIGS. 4a to 4j show the timing of the various bits (D10-D1) of the shifter during an IDLE stream followed by the start of a frame. FIGS. 4a to 4j show the byte synchronization timing through the ENDEC receiver for a different alignment of a new start of frame (JK) from the previous byte alignment. The new byte alignment can differ anywhere from 0 to 9 bits from the previous alignment.

In the Figures, the timing indicated by "CRX" corresponds to the recovered received bit clock from ENDEC Data Separator 50. The timing indicated by "D6, D7, D8, D9, D10, D1, D2, D3, D4, D5" corresponds to the 10 bits in the Serial to Parallel Shift Register 52 output from the right to left.

The timing indicated by "JK SYNC" corresponds to the byte synchronization signal which occurs once every 10 bits synchronized to the start of frame (JK) produced by the BYTE SYNC 58. The timing indicated by "/WRT" corresponds to a signal from BYTE SYNC 58 which occurs once every 10 bits, three bit times delayed from JK SYNC signal. The signal indicated by /WRT FIFO originates from WRT DISABLE logic 90 to FIFO 64 and enables writing DECODE 62 output to FIFO 64. The signal indicated by "Level 1, FIFO " represents contents of first level of FIFO 64. It changes on every positive edge of /WRT signal.

Figure 4A:
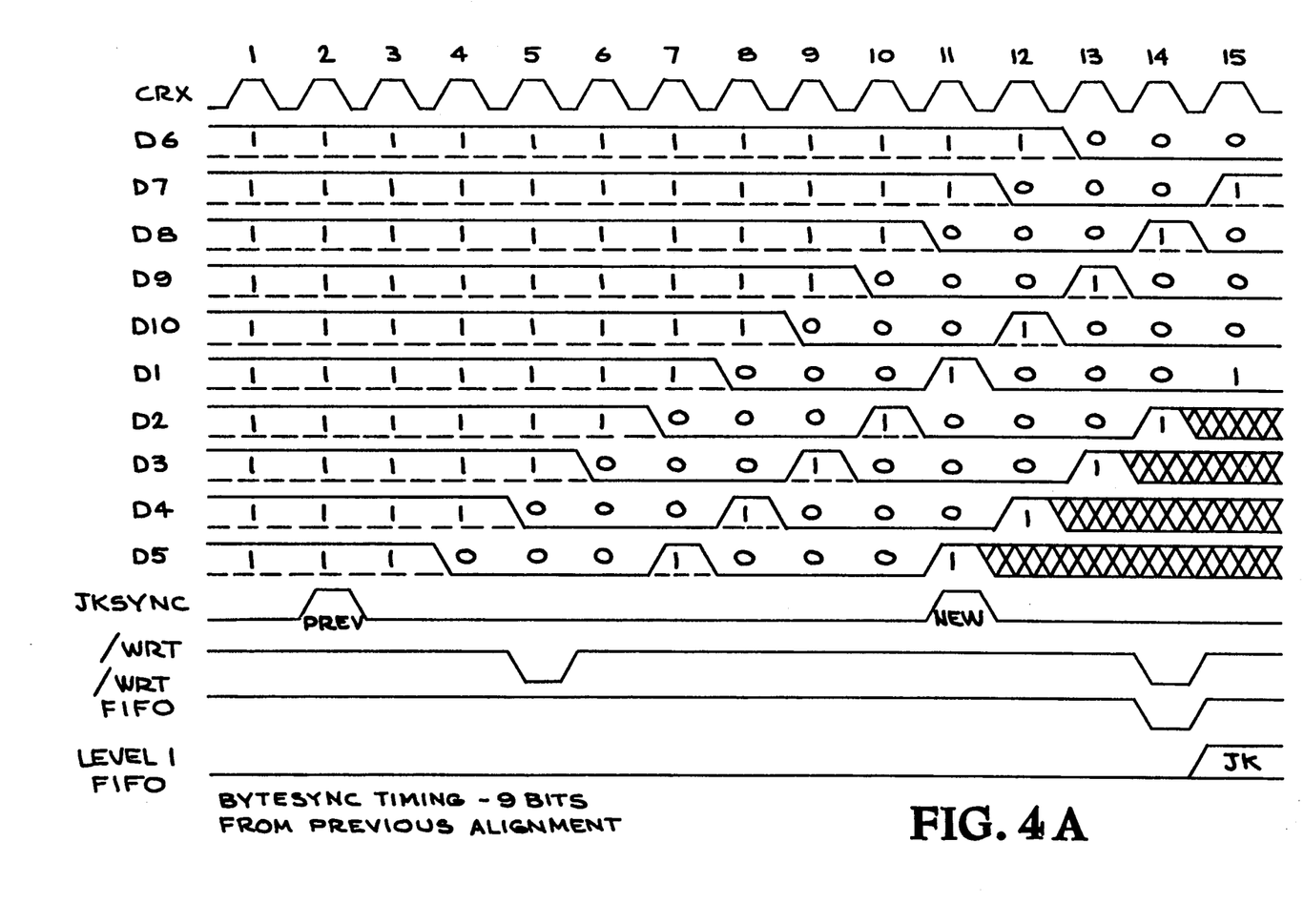
FIGS. 4a to 4j show the timing of the various bits in the shift register during receipt of data information.
Figure 4B:
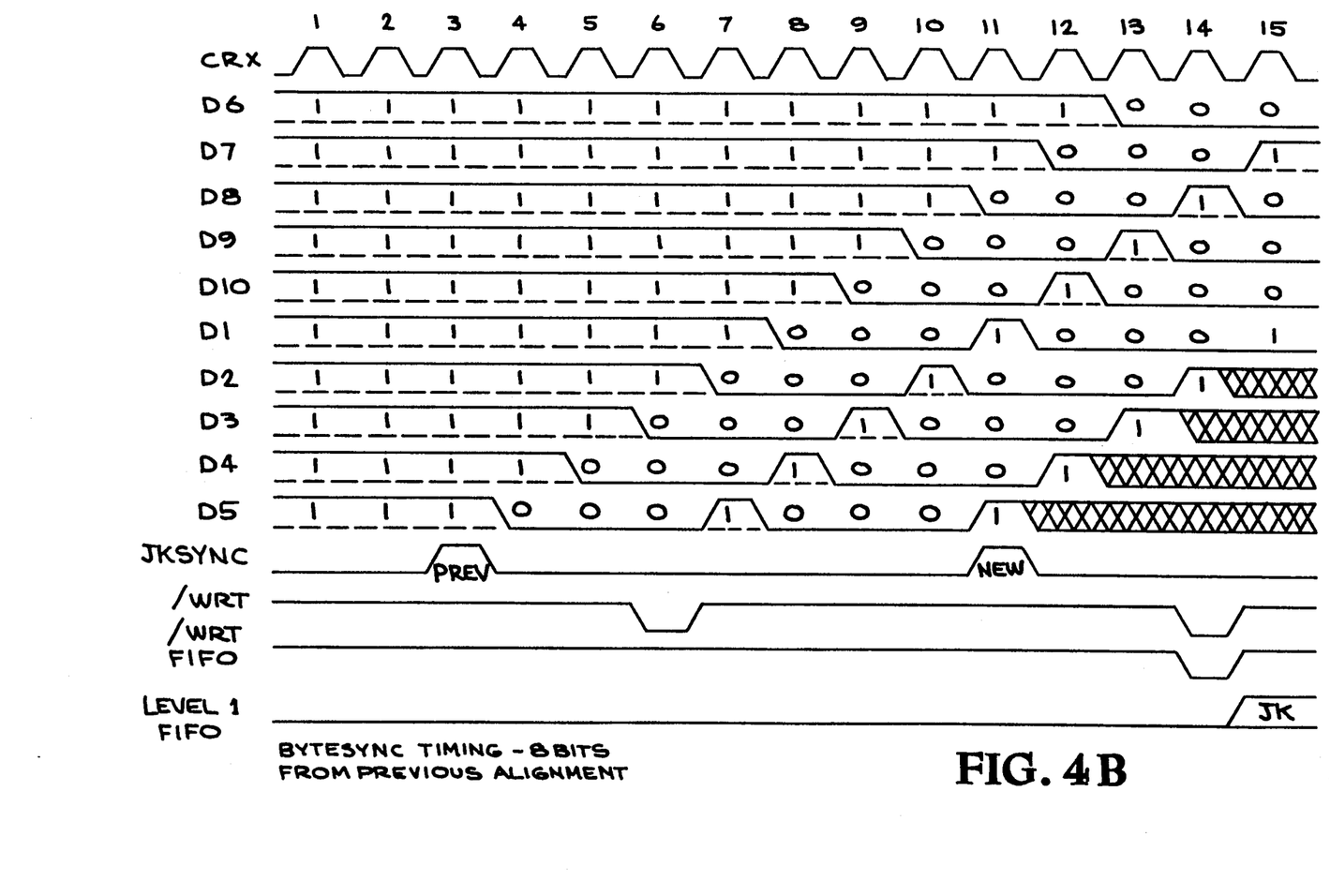
Figure 4C:
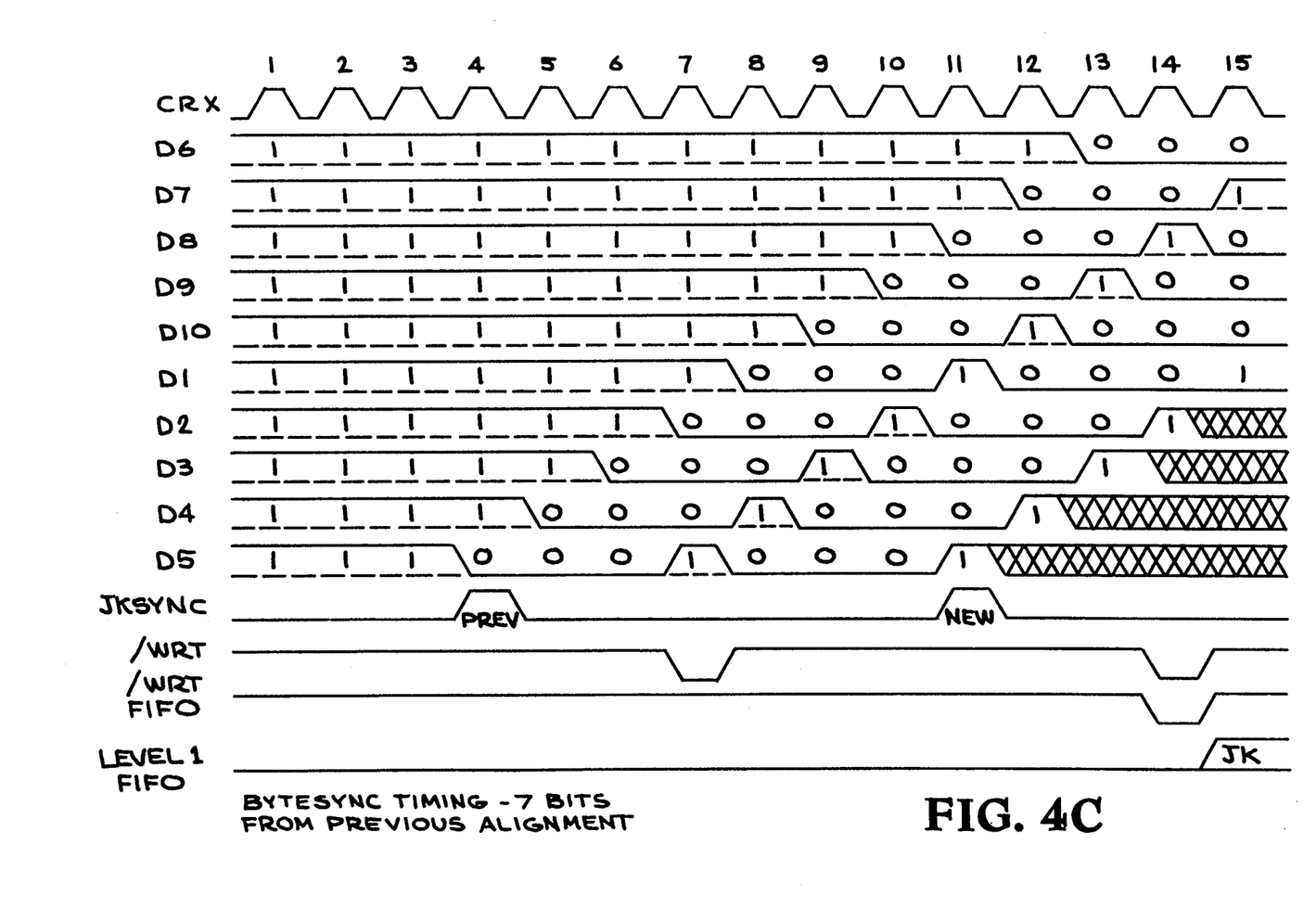
Figure 4D:
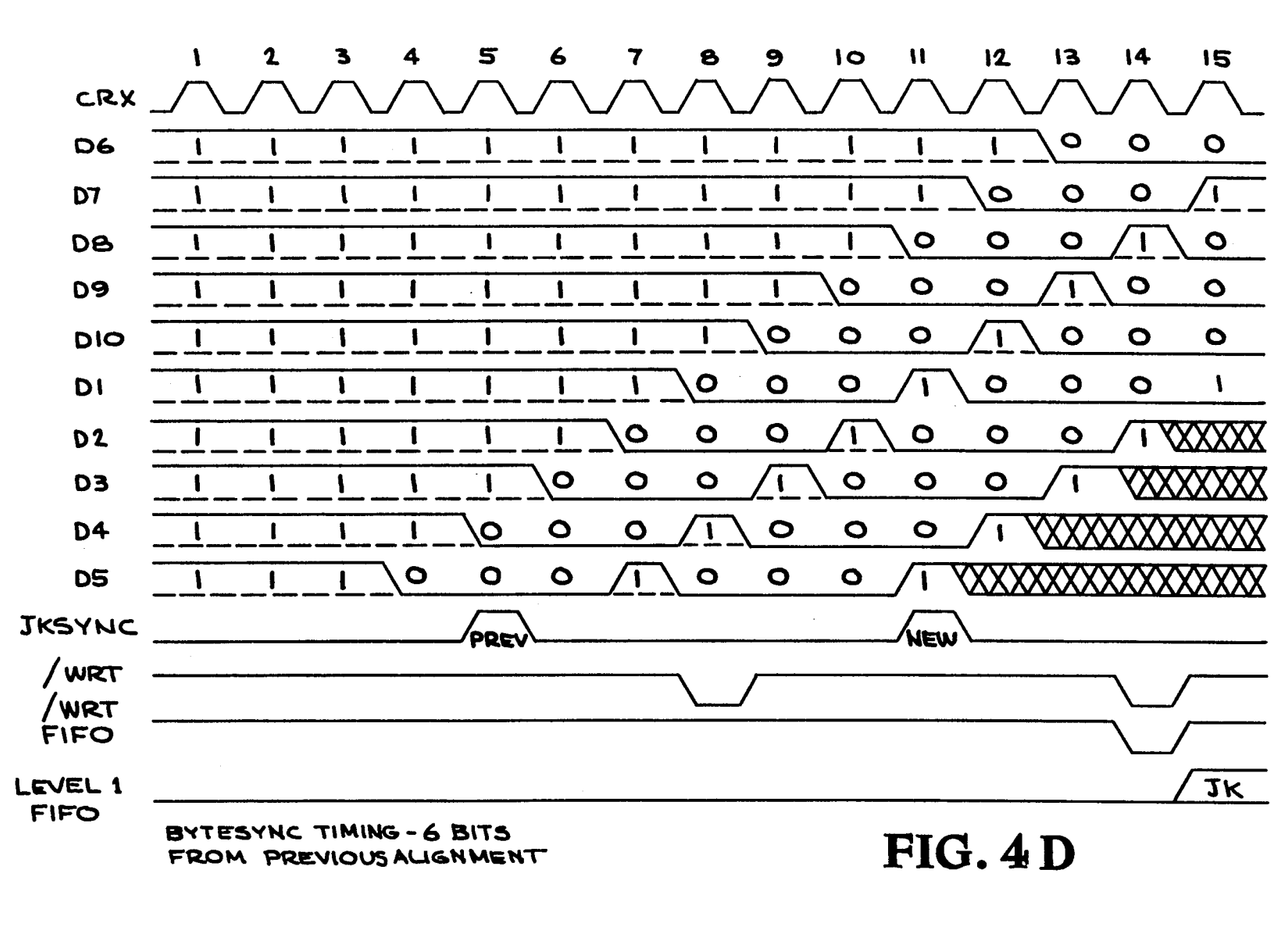
Figure 4E:
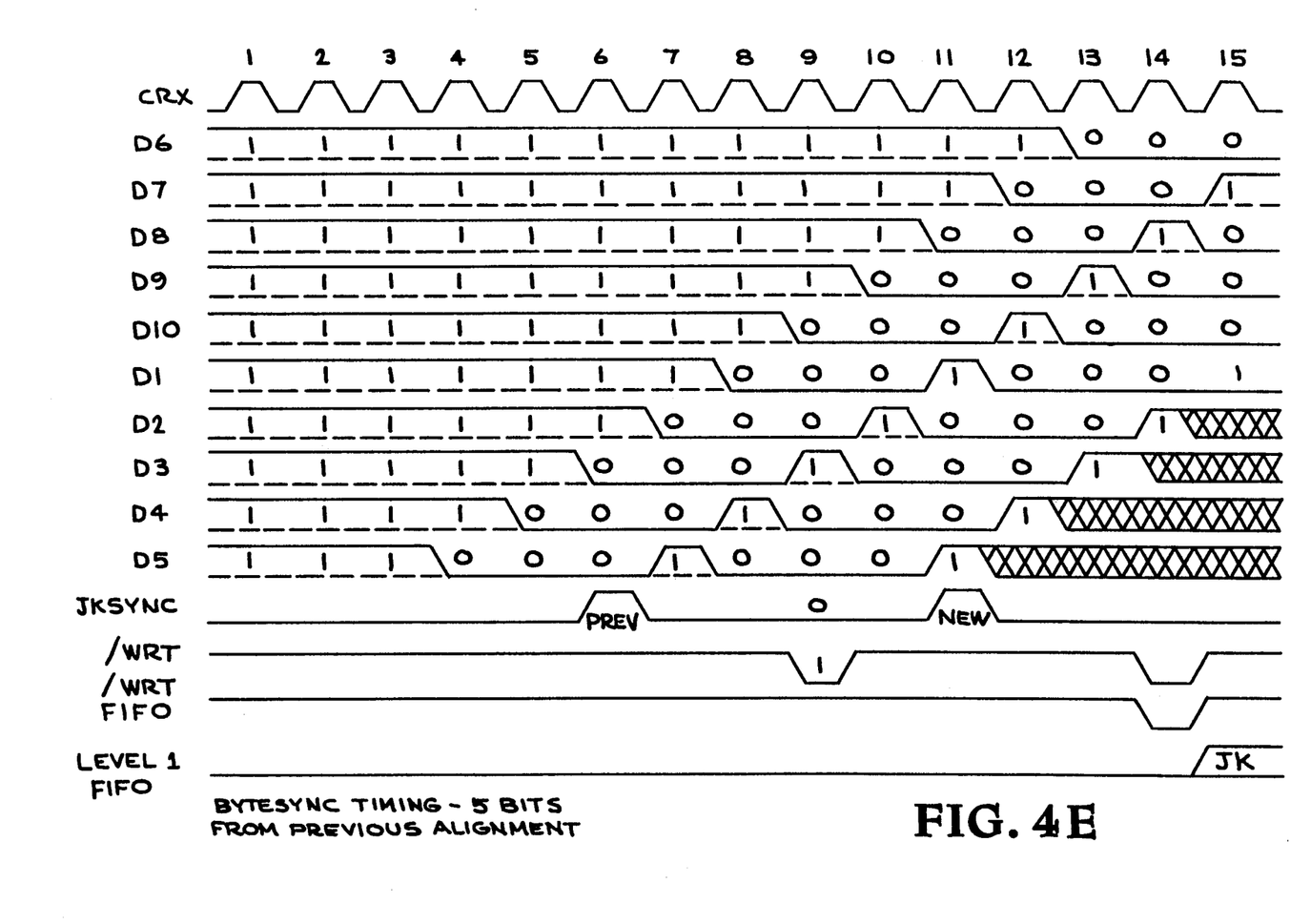
Figure 4F:
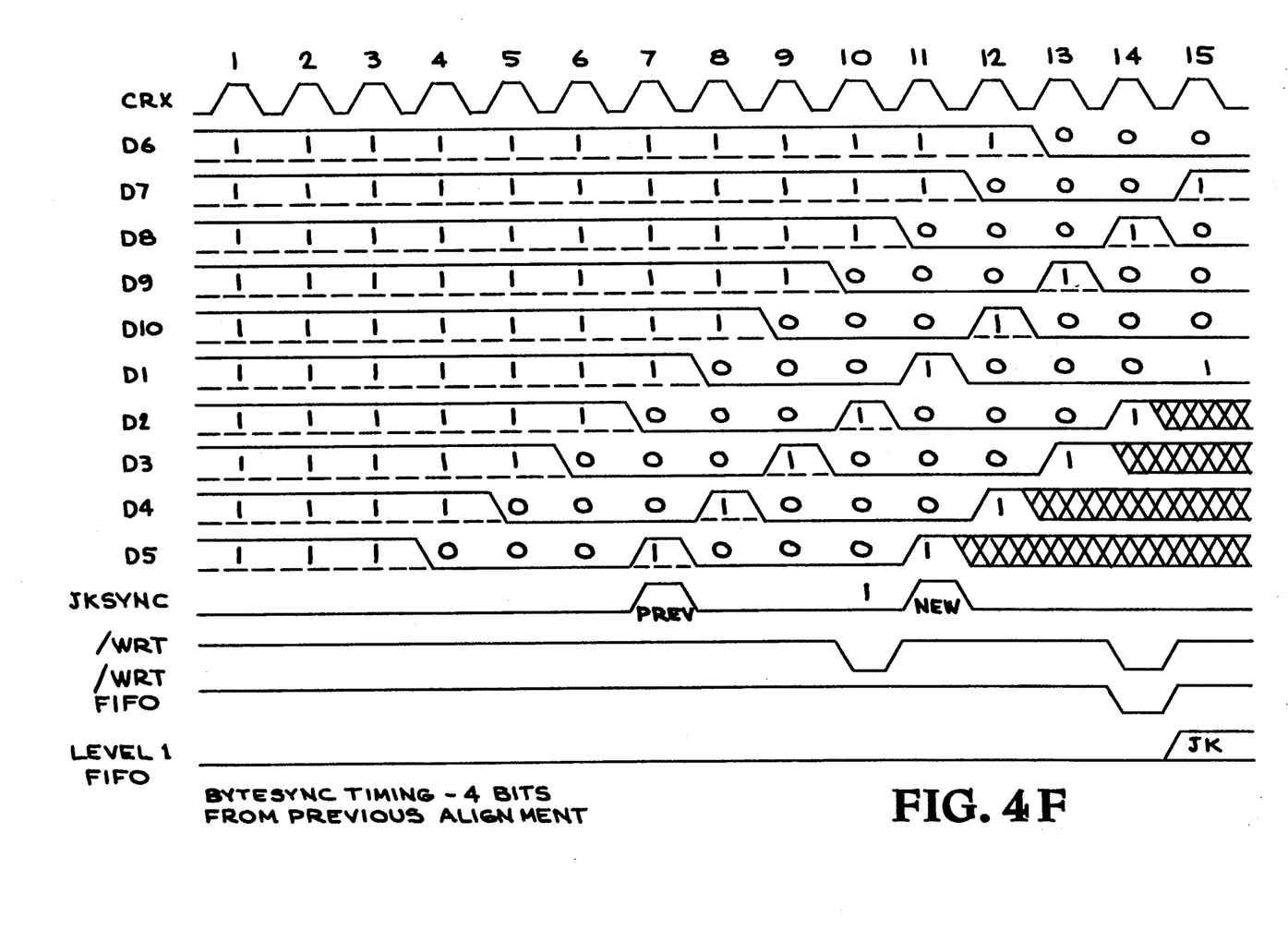

In FIG. 4a, the new JK (11 000, 1000 1) signal corresponding to the start of a new frame is 9 bits skewed from the previous JK SYNC. Hence, the new JK SYNC is 9 bit times delayed from PREV JK SYNC. The contents of the serial to parallel Shift Register 52 during PREV JK SYNC is all 1s corresponding to an IDLE byte. So, even though WRT signal is active 3 bits delayed from PREV JK SYNC, /WRT FIFO signal is never generated because D8 remains HIGH. /WRT FIFO also remains HIGH. During /WRT signal for the NEW JK SYNC, JK (11 000, 1000 1), /WRT FIFO all go active, and the JK BYTE is written to LEVEL 1 FIFO at the positive edge of /WRT FIFO signal.

Figure 4G:
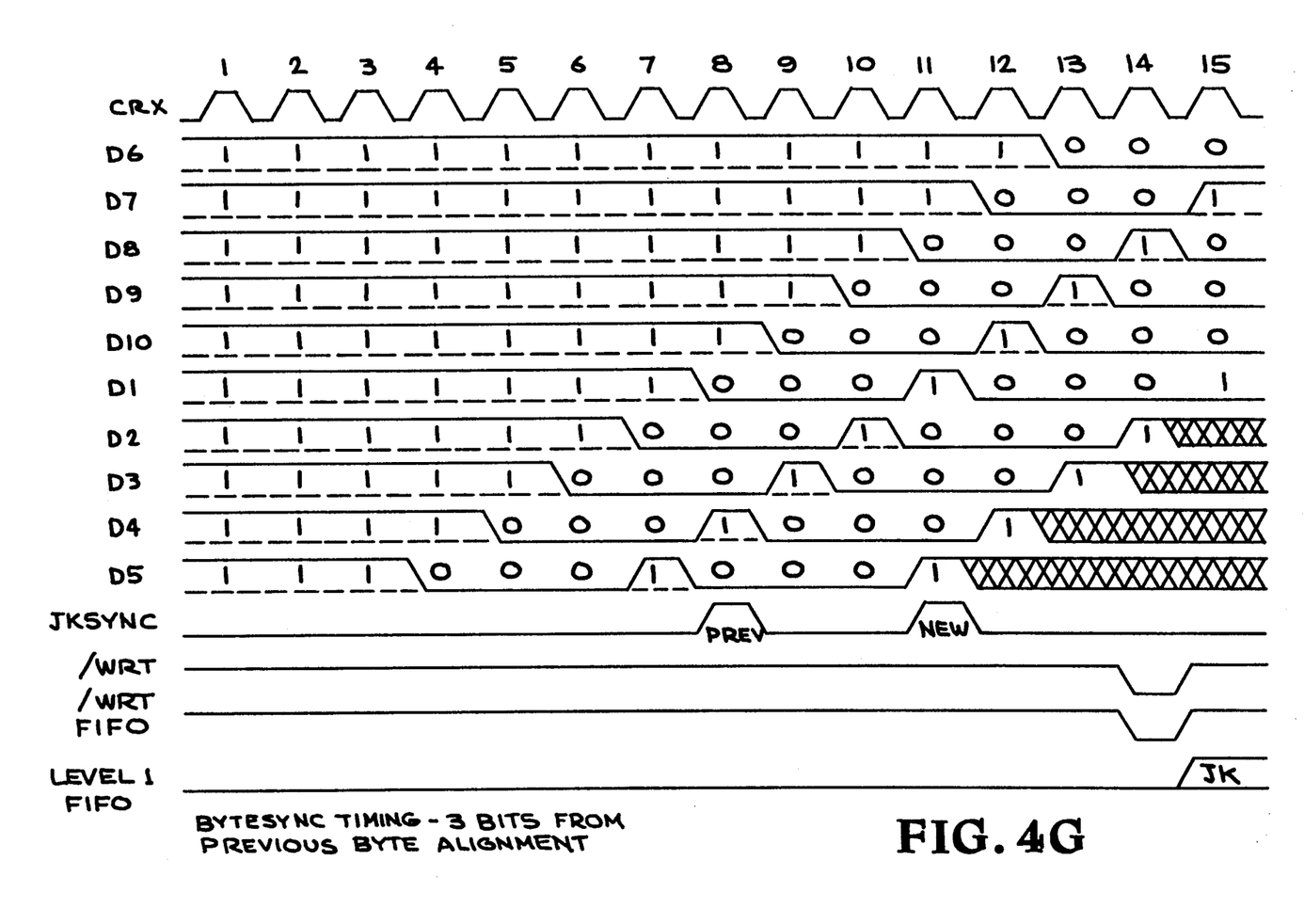

Similarly, for FIGS. 4b to 4f, even though the /WRT is generated from BYTE SYNC logic for PREV JKSYNC, since D8 is HIGH, the /WRT FIFO signal is not generated. In FIG. 4g, the new JK is 3 bits delayed from the PREV BYTE SYNC. Hence, a /WRT signal is never generated for the PREV BYTE SYNC because NEW BYTE SYNC overrides the /WRT signal.

Figure 4H:
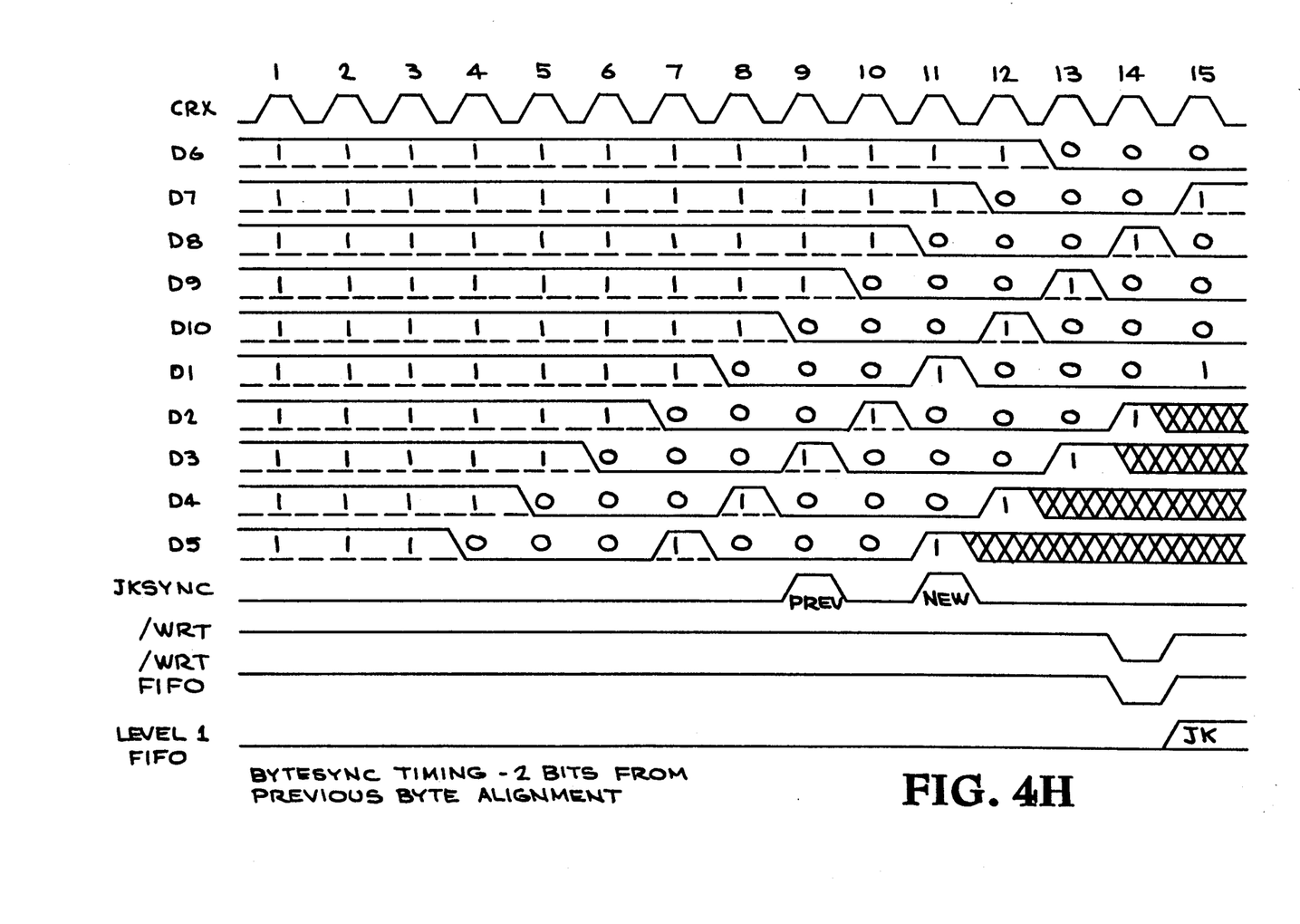
Figure 4I:
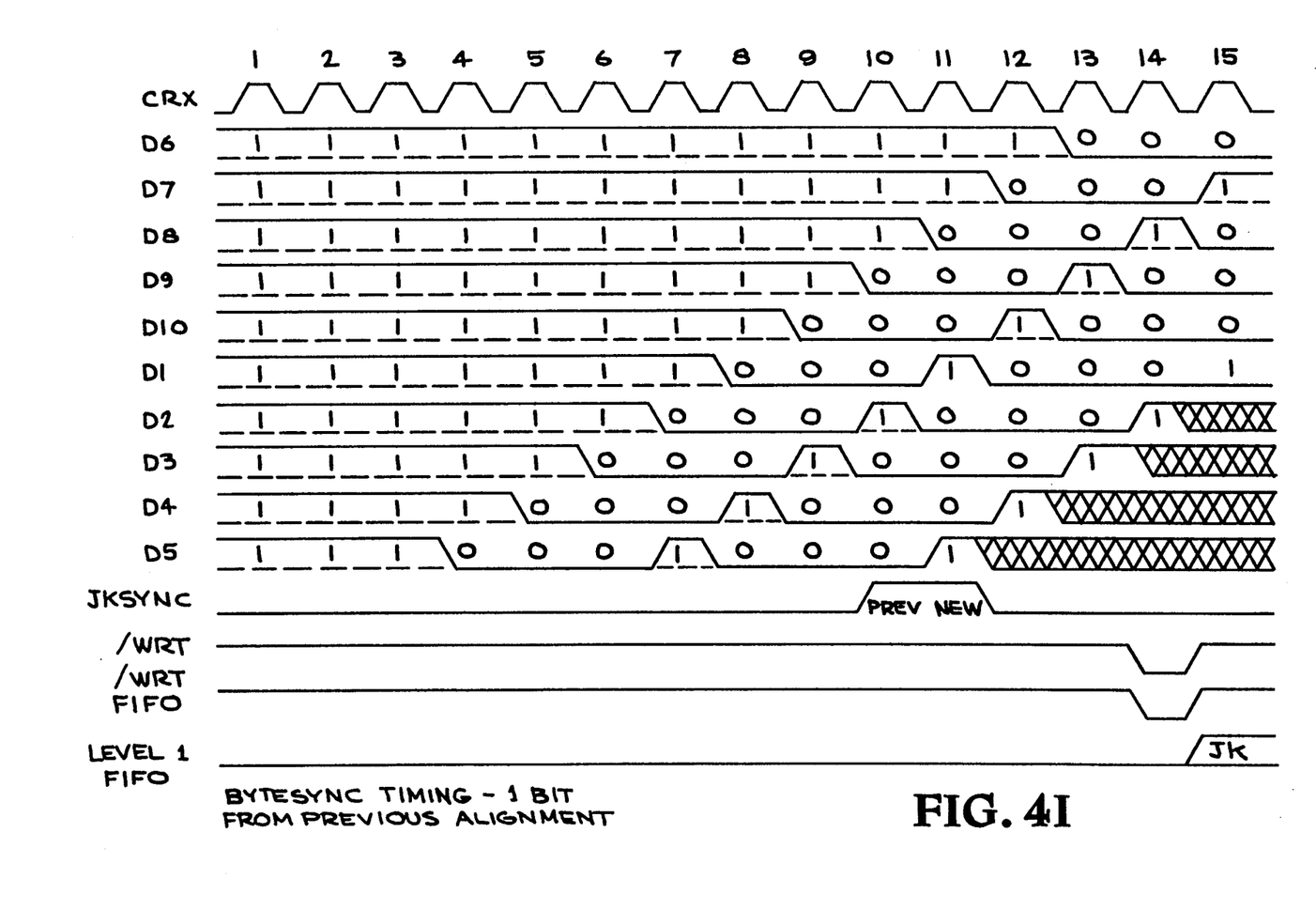

In FIGS. 4h and 4i also, the /WRT signal is not generated because of the NEW BYTE SYNC overriding any previous /WRT signals and therefore the new JK BYTE is 2 and 1 bit delayed from PREV BYTE SYNC, respectively.

Figure 4J:
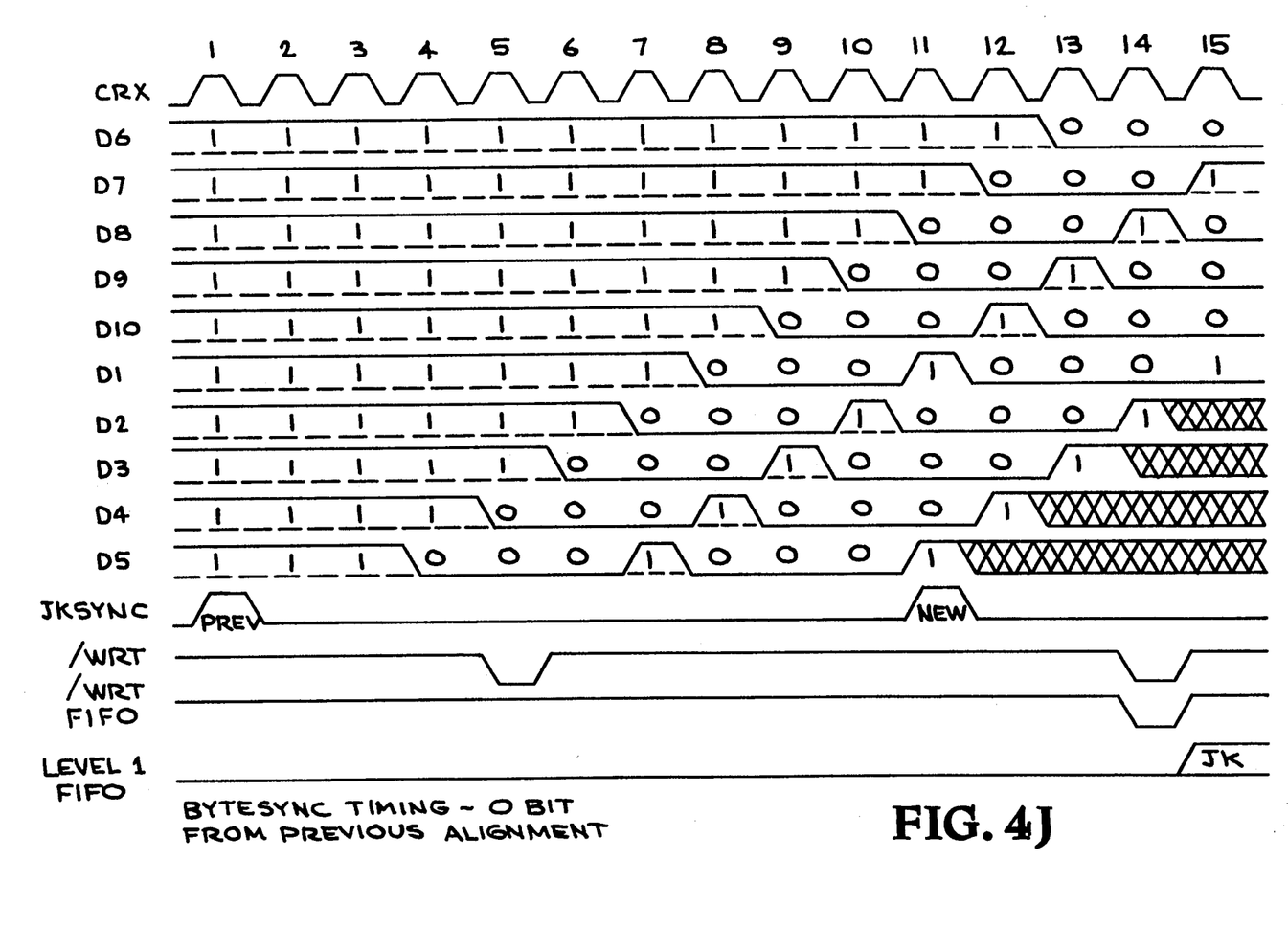

In FIG. 4j, the NEW BYTE SYNC is exactly 10 bits delayed from PREV BYTE SYNC and the same alignment is retained.

Hence, through the use of this embodiment, fragment byte is effectively prevented from being written into first level of FIFO by using signal /D8 from the serial to parallel Shift Register 52.

The above described embodiment can be modified in a variety of way and those modifications would still be within the spirit and scope of the present invention. Thus, while this invention has been disclosed by means of a specific illustrative embodiment the principles thereof are capable of a wide range of modification by one of ordinary skill in the art within the scope of the following claims.

What is claimed is:

1. In an Encoder/Decoder (ENDEC) receiver utilized in a Fiber Distributed Data Interface (FDDI) network, said receiver including a first in-first out (FIFO) memory, and a serial to parallel shifter for receiving data information from other nodes within the network; an apparatus for ensuring that the data information received from other nodes is accurately decoded without generating a fragment byte, comprising:

means for detecting a first predetermined signal received in said shifter from another node in the network, said predetermined signal indicating that said another node is idle; and logic for controlling the writing of data information into said FIFO memory, wherein said logic disables writing of received data information to said FIFO memory in response to an output signal from the detecting means indicating that said predetermined signal has been detected, and wherein said logic enables writing of received data information to said FIFO memory in response to receipt of a second predetermined signal in said shifter, thereby providing for the transmission of said data information from said ENDEC receiver.

2. The apparatus of claim 1 in which said detecting means comprises a circuit for recognizing the first predetermined signal in the serial to parallel shifter.

3. The apparatus of claim 1 in which said logic comprises a write disable circuit connected to selectively enable and disable the FIFO memory.

4. The apparatus of claim 1 in which said logic comprises means for detecting said second predetermined signal in an output from said serial to parallel shifter means.

5. In an Encoder/Decoder (ENDEC) receiver utilized in a Fiber Distributed Data Interface (FDDI) network, said receiver including a first in-first out (FIFO) memory, and a serial to parallel shifter for receiving data information from other nodes within the network; a method for ensuring that the data information received from other nodes is accurately decoded comprising the steps of:

(a) detecting a first predetermined signal received in said shifter from another node in the network, said predetermined signal indicating that said another node is idle;

(b) disabling writing of received data information to said FIFO memory when said first predetermined signal is detected; and (c) writing received data information into said FIFO memory upon detection of a second predetermined signal received in said shifter, thereby providing for the transmission of said data information from said ENDEC receiver.

6. An Encoder/Decoder (ENDEC) receiver which can be utilized in a Fiber distributed Interface (FDDI) network comprising:

a shift register for changing serially received data to parallel data;

means for decoding said parallel data;

a first in-first out (FIFO) memory for receiving the decoded parallel data, the FIFO memory having a plurality of levels for receiving said decoded parallel data;

means for detecting a first predetermined signal, in said shift register, received from another node in the network, said first predetermined signal indicating that said another node is idle;

means for disabling writing of data to said FIFO memory when said first predetermined signal is detected by the detecting means;

means for enabling writing of said decoded parallel data to said FIFO memory upon receipt of a second predetermined signal by said shift register; and means for receiving said decoded parallel data from said FIFO memory wherein said receiving means provides said parallel data to another portion of the FDDI network.

7. The ENDEC receiver of claim 6 in which said detecting means comprises a gate circuit in said shift register for detecting said first predetermined signal and outputting a signal from said shift register in response thereto.

8. The ENDEC receiver of claim 7 in which the disabling means comprises a write disable circuit which is responsive to said signal from said shift register.

9. The ENDEC receiver of claim 8 in which the enabling means operate responsive to a second predetermined signal from said shift register.

10. In an Encoder/Decoder (ENDEC) receiver in a node of a data communication network, an apparatus for ensuring that data received from other network nodes is accurately decoded without generating a fragment byte, said apparatus comprising:

first detecting means for detecting receipt of a first predetermined data signal from another network node;

second detecting means for detecting receipt of a second predetermined data signal from said another network node; and a logic circuit for controlling writing of received data within said receiver, wherein said logic circuit disables writing of received data in response to the detection of said first predetermined data signal by said first detecting means, and said logic circuit enables writing of received data in response to the detection of said second predetermined data signal by said second detecting means.

11. An apparatus as claimed in claim 10, wherein said first detecting means comprises a serial to parallel shift register which receives data signals from said other network nodes, said shift register producing an output to said logic circuit when data comprising said second predetermined data signal has been shifted into said shift register.

12. An apparatus as claimed in claim 11, wherein said first detecting means comprises a gate circuit responsive to data in said shift register, said gate circuit detecting receipt of the first predetermined data signal in said shift register.

* * * * *